United States Patent
Shen et al.

(10) Patent No.: US 10,354,284 B2
(45) Date of Patent: Jul. 16, 2019

(54) SYSTEM AND METHOD FOR ESTIMATING AND CLUSTERING MULTIPLE-DIMENSION CHARACTERISTICS FOR AUCTION-BASED MESSAGE DELIVERY

(71) Applicant: Palo Alto Research Center Incorporated, Palo Alto, CA (US)

(72) Inventors: Jianqiang Shen, Santa Clara, CA (US); Oliver Brdiczka, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 466 days.

(21) Appl. No.: 14/098,327

(22) Filed: Dec. 5, 2013

(65) Prior Publication Data

US 2015/0161670 A1    Jun. 11, 2015

(51) Int. Cl.
*G06Q 30/02*    (2012.01)

(52) U.S. Cl.
CPC ..... *G06Q 30/0269* (2013.01); *G06Q 30/0275* (2013.01)

(58) Field of Classification Search
CPC .................. G06Q 30/0269; G06Q 30/0275
See application file for complete search history.

(56) References Cited

U.S. PATENT DOCUMENTS

| | | | | |
|---|---|---|---|---|
| 8,600,809 B1* | 12/2013 | Kubica | ......... | G06Q 30/02 705/14.41 |
| 2013/0006900 A1* | 1/2013 | Taylor | ......... | G06F 17/30958 706/12 |
| 2013/0297543 A1* | 11/2013 | Treiser | ......... | 706/45 |
| 2014/0108308 A1* | 4/2014 | Stout | ......... | G06N 3/08 706/12 |

OTHER PUBLICATIONS

Haughvedt, Curtis et al: Need for Cognition and Advertising: Understanding the Role of Personality Variables in Consumer Behavior, available at: : https://onlinelibrary.wiley.com/doi/abs/10.1016/S1057-7408(08)80038-1 (Year: 1992).*

Ruiz de Maya, Salvador and Maria Sicilia: "The impact of Cognitive and/or affective processing styles on consumer response to advertising appeals", https://www.researchgate.net/publication/4967034_The_impact_of_cognitive_andor_affective_processing_styles_on_consumer_response_to_advertising_appeals (Year: 2004).*

* cited by examiner

*Primary Examiner* — Katherine Kolosowski-Gager
(74) *Attorney, Agent, or Firm* — Shun Yao; Park, Vaughan, Fleming & Dowler LLP (57) ABSTRACT

One embodiment of the present invention provides a system for characteristics-based message delivery. During operation, the system receives activity data associated with a user, and infers a characteristic profile associated with the user based on the received activity data. The system further receives a plurality of messages, estimates the user's preference for the messages based on the inferred characteristic profile and content of the messages, selects a message from the plurality of messages based on the user's preference and a pre-determined bidding price associated with the message and the characteristic profile, and delivers the selected message to the user.

20 Claims, 5 Drawing Sheets

SYSTEM AND METHOD FOR ESTIMATING AND CLUSTERING MULTIPLE-DIMENSION CHARACTERISTICS FOR AUCTION-BASED MESSAGE DELIVERY

STATEMENT OF GOVERNMENT-FUNDED RESEARCH

This invention was made with U.S. government support under Contract No. W911NF-11-C-0216 (3729) awarded by the Army Research Office. The U.S. government has certain rights in this invention.

BACKGROUND

Field

This disclosure is generally related to the delivering of messages, such as advertisements and promotion coupons. More specifically, this disclosure is related to a system that delivers messages based on estimated characteristics and an auction price.

Related Art

Targeted advertising has been gaining popularity because it has been shown that a targeted advertisement is more effective in converting an ad viewer into a consumer of the product being advertised. Hence, targeted advertising can often generate more revenue for advertisers than non-targeted advertising. To increase the effectiveness of targeted advertising, accuracy in audience selection is key. Current systems that deliver messages, such as advertisements, promotion coupons, and political campaign messages, often rely on keyword-matching techniques, in which keywords searched for by the user or extracted from web pages viewed by the user can be used to match keywords associated with certain advertisements. In addition, current message-delivery systems may also be able to deliver messages to targeted audiences based on the demographic profiles of those audiences. However, such systems often ignore other more important factors, such as personality characteristics, that may affect the effectiveness of the targeted advertising.

SUMMARY

One embodiment of the present invention provides a system for characteristics-based message delivery. During operation, the system receives activity data associated with a user, and infers a characteristic profile associated with the user based on the received activity data. The system further receives a plurality of messages, estimates the user's preference for the messages based on the inferred characteristic profile and content of the messages, selects a message from the plurality of messages based on the user's preference and a pre-determined bidding price associated with the message and the characteristic profile, and delivers the selected message to the user.

In a variation on this embodiment, the activity data includes one or more of: behavior data, social networking data, and textual data.

In a variation on this embodiment, inferring the characteristic profile involves applying a machine-learning technique to the activity data in order to derive Big Five personality traits associated with the user.

In a variation on this embodiment, the system maps the inferred characteristic profile to a pre-defined group comprising a plurality of different characteristic profiles.

In a further variation, the system receives, from a merchant company, a bidding price for delivering a message to users having a characteristic profile within the pre-defined group.

In a further variation, the pre-defined group is a node of a hierarchical tree, and characteristic profiles within the pre-defined group also belong to a parent node of the pre-defined group.

In a variation on this embodiment, selecting the message involves estimating an expected benefit for delivering the message, and estimating the expected benefit involves calculating a product of a likelihood that the user clicks the message and the pre-determined bidding price.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a solution for maximizing the expected benefits of the delivered messages. More specifically, embodiments of the present invention provide a message-delivery system that is capable of predicting personality-related characteristic profiles of users and auctioning off the message-delivery opportunities for users with a specific characteristic profile to advertisers. The message-delivery system includes a characteristic predictor that predicts users' characteristics based on collected users' behaviors, and a preference predictor that predicts users' preferences for certain messages based on the users' characteristics. Advertisers can bid for message-delivery opportunities, which are defined by the users' or recipients' characteristic profiles. If the bid is accepted, the messages will be delivered to recipients with the desired characteristic profiles.

Multiple-Dimension User Characteristics

Conventional message-delivery systems, such as targeted online advertising, often rely on keyword-matching techniques or demographic-targeting techniques. However, both keyword matching and demographic targeting neglect some key factors that can impact the effectiveness of the messages, such as psychological factors.

Most commercial advertisers attempt to generate increased consumption of their products or services through "branding," which may involve associating a product name or image with certain qualities in the minds of consumers. Hence, the messages they deliver, either advertisements or promotion coupons, might be particularly interesting to persons with specific personality characteristic profiles. For example, sports cars often attract people who are risk takers. Hence, advertisements using sports cars as tools (for example, beverage advertisements involving sports cars) may attract the attention of risk takers, causing them to click the advertisement link. Moreover, persons with certain characteristics can be more influential and may affect others' opinions of a product. To maximize the "benefit" of the messages, advertisers may wish to target people who may be interested in their products, as well as people who may influence others to buy their product. Note that the "benefit" of a message delivered online can be measured by both the click-through (when the viewer clicks on the link) rate and the conversion (when the viewer adopts the product) rate.

A person's characteristics typically include multiple aspects, and each aspect could be assigned a real number. For example, based on the Big Five model, human personality can include five dimensions: extraversion, agreeableness, neuroticism, conscientiousness, and openness to experience. Extraversion is characterized by breadth of activities (as opposed to depth), surgency from external activity/situations, and energy creation from external means. People measuring higher on the extraversion scale tend to be more outgoing, gregarious and energetic, while people with lower extraversion scores tend to be more reserved, shy, and quiet. Agreeableness reflects individual differences in general concern for social harmony. Agreeable individuals value getting along with others. They are generally friendly, caring, and cooperative, whereas disagreeable people may be suspicious, antagonistic, and competitive toward others. Neuroticism is the tendency to experience negative emotions, such as anger, anxiety, or depression. It is sometimes called emotional instability. Individuals with high neuroticism scores tend to be more nervous, sensitive, and vulnerable, whereas individuals with low neuroticism scores tend to be calm, emotionally stable, and free from persistent negative feelings. Conscientiousness is a tendency to show self-discipline, act dutifully, and aim for achievement against measures of outside expectations. It is related to the way in which people control, regulate, and direct their impulses. Individuals with high conscientiousness scores often are more organized, self-disciplined, and dutiful, whereas individuals with lower scores are more careless, spontaneous, and easygoing. Openness to experience is a general appreciation for art, emotion, adventure, unusual ideas, imagination, curiosity, and a variety of experience. People who are open to experience are intellectually curious, appreciative of art, and sensitive to beauty, as well as being imaginative with a tendency toward abstract thought. On the other hand, people who are less open can have more conventional and traditional interests, and may be more down-to-earth.

Using the Big Five model, one may express an individual's personality using a five-dimension real-value factor. For example, using a scale of 1-100, an individual's personality may be expressed as: {extraversion=80, agreeableness=90, neuroticism=25, conscientiousness=75, openness=55}. However, such a multiple dimension factor can be difficult for human operators, such as clerks at the merchant companies, to handle because such multi-dimension vectors are complex and not intuitive. This can be even more challenging considering that the number of users, and thus the number of multi-dimension vectors, can be large. To make things more manageable, in some embodiments of the present invention, users' characteristic profiles (measured by the Big Five factors) are clustered into a limited number of groups, with each group representing a typical characteristic. Once the groups are defined, real-value multi-dimension vectors can be mapped into appropriate groups. The mapping process involves determining the non-overlapping region of each group, and then calculating into which region a characteristic profile falls. In one embodiment, the non-overlapping region of a group can be determined by dividing spaces (in vector space) between two groups based on the distance to the group center. If the multi-dimension vector representing a characteristic profile falls within a group's region in the vector space, then the characteristic profile is assigned to that particular group. By considering group labels instead of multi-dimension vectors, the number of choices to consider by merchant companies when they bid for advertisement opportunities is significantly reduced. For example, a group labeled as "couch potatoes" may include all users with considerably low extraversion and openness scores. As long as those two scores are low, corresponding user characteristic profiles (regardless of their scores in agreeableness, neuroticism, or conscientiousness) can be mapped into the "couch potato" group. Hence, for a merchant company targeting couch potatoes for their advertisement, they do not have to deal with the complex multi-dimensional real-value factors which are used to measure the users' personalities; instead, they only need to bid for an advertisement opportunity for the "couch potato" group.

Various clustering techniques can be used to cluster user characteristic profiles into groups. In some embodiments, human labeling is used. For example, domain experts can hand-label the user characteristic profiles in order to place them into groups. In some embodiments, unsupervised machine-learning methods, such as k-means or agglomerative clustering, are used to cluster user characteristic profiles into groups.

In addition to clustering user characteristic profiles into groups, it is also possible to organize the user characteristic profiles into a hierarchical tree, with each level of the tree giving an abstraction level of characteristics: the root node is the most abstract level, and the leaf nodes are the most specific.

Figure 1:
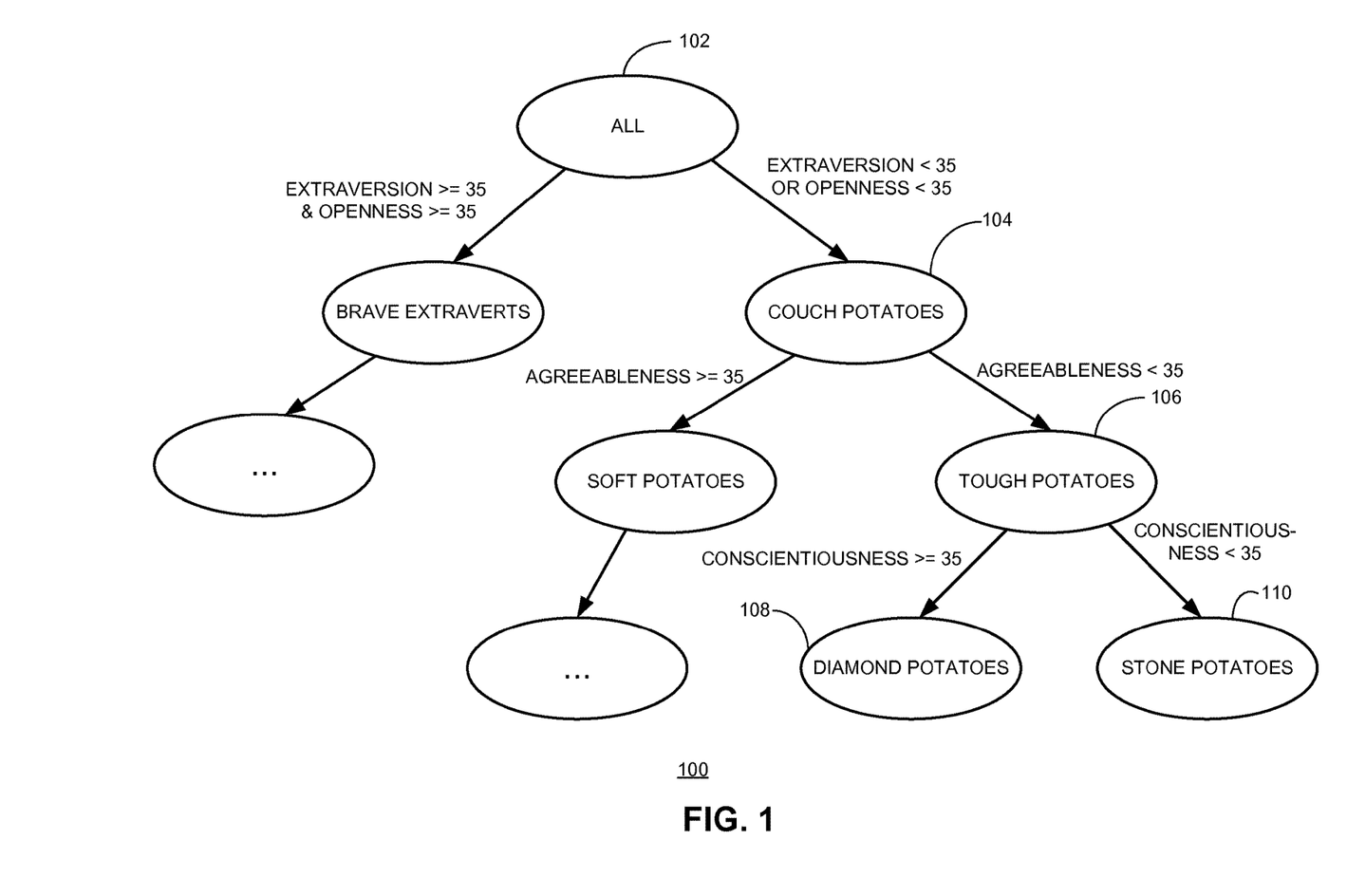
FIG. 1 presents a diagram illustrating an exemplary hierarchical tree of the user characteristic profiles, in accordance with an embodiment of the present invention.

FIG. 1 presents a diagram illustrating an exemplary hierarchical tree of the user characteristic profiles, in accordance with an embodiment of the present invention. Hierarchical tree 100 includes a root node 102; a number of intermediate nodes, such as nodes 104 and 106; and a number of leaf nodes, such as nodes 108 and 110.

Root node 102 is labeled as "all," meaning it includes all types of characteristic profiles. In the example shown in FIG. 1, root node 102 has two child nodes, which are labeled as "brave extraverts" and "couch potatoes." The "brave extravert" group includes characteristic profiles with extraversion values and openness values greater than or equal to 35 (on a scale of 1-100). On the other hand, the "couch potatoes" group includes characteristic profiles that have extraversion values or openness values less than 35. Note that the users' characteristic profiles can be clustered into these two groups based on their extraversion values and their openness values, regardless of values in other dimensions, such as agreeableness, conscientiousness, and neuroticism. On the other hand, the values in the other dimensions might be used to further divide a parent group into a number of child groups. In the example shown in FIG. 1, intermediate node 104 labeled "couch potatoes" also includes two child nodes, which are labeled as "soft potatoes" and "tough potatoes." User profiles within the "couch potatoes" group can be further clustered into the "soft potatoes" group if their agreeableness values are greater than or equal to 35; otherwise, they will be clustered into the "tough potatoes" group. Similarly, intermediate node 106 labeled "tough potatoes" has two child nodes, which are labeled "diamond potatoes" and "stone potatoes." In other words, user profiles within the "tough potatoes" group can be further clustered into the "diamond potatoes" group if their conscientiousness values are greater than or equal to 35; otherwise, they will be clustered into the "stone potatoes" group. Note that hierarchical tree 100 demonstrates the parent-child relationship among labeled groups. Parents and children are similar, and parents cover all characteristics in the child groups. If a characteristic profile belongs to a child node, then it will also belong to it upper-level parent nodes. For example, if a user characteristic profile belongs to the group "stone potatoes," then it must also belongs to the parent group "tough potatoes" and the grandparent group "couch potatoes."

Organizing the user characteristic profiles into a hierarchical tree is advantageous because it can provide the merchant company with different levels of granularity in audience targeting. For example, a merchant company may choose to target a larger group of "couch potatoes" or a smaller group within the "couch potatoes," such as the group of "soft potatoes" or the group of "diamond potatoes." The merchant company may also bid at different prices for the targeted groups. In general, the more specific the group, or the lower the node location on hierarchical tree 100, the higher the bidding price.

Various methods can be used to generate the hierarchical tree. In some embodiments, domain experts are used to design such a hierarchical tree manually. In some embodiments, machine-learning methods can be used to generate the hierarchical tree. For example, the system can first apply unsupervised machine-learning methods, such as k-means and agglomerative clustering, to cluster user characteristic profiles into $n_1$ groups. Subsequently, the system continues to apply the same machine-learning method to the $n_1$ groups to cluster them into $n_2$ groups ($n_2<n_1$), and so on until a small enough number of groups is obtained. Such a method can merge the user characteristic profiles into a tree structure. Alternatively, a hierarchical clustering technique (either agglomerative or divisive) can be applied to directly generate the hierarchy of clustered groups. Other alternatives for obtaining the hierarchical tree may involve using a deep learning algorithm to estimate a person's characteristic profile. The learned deep network can provide different levels of abstraction of a person's characteristics from outputs of different levels, which also correspond to the different levels in the hierarchy tree.

When applying the deep learning algorithm to estimate a user's characteristics, various types of information associated with the user, such as text information (information related to a user's choice of names (e.g., username, email address, or game character name), writing style (e.g., email writing), and other textual data entered by (and/or otherwise associated with) the user); social networking information (information related to the user's online interaction and connections with other people); and behavior information (information related to any other online actions, properties, and possessions associated with the user), are needed as inputs.

Figure 2:
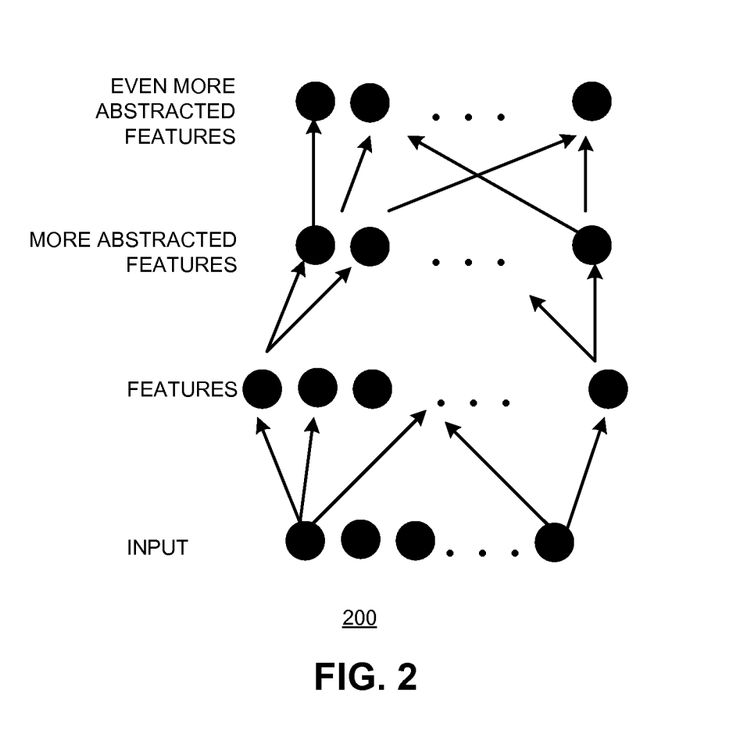
FIG. 2 presents a diagram illustrating an exemplary deep neural network.

To obtain a deep neural network, in one embodiment, an auto-encoder algorithm is used. An auto encoder is trained to encode the input x into some representation c(x) so that the input can be reconstructed from that representation. The target output of the auto-encoder is the auto-encoder input itself. If there is one linear hidden layer and the mean squared error criterion is used to train the network, then the k hidden units learn to project the input in the span of the first k principal components of the data. Multiple encoders (and their corresponding decoders) can be stacked when building a deep neural network, resulting in a deep neural network shown in FIG. 2. In FIG. 2, deep neural network 200 includes an input layer that includes a number of input nodes, and a number of layers, with upper layers being more abstract than lower layers.

During operation, the system first performs unsupervised pre-trainings (without using any characteristic labels) on obtained user information. After the unsupervised pre-training is finished, a characteristic predictor can be trained by adding one more output layer for characteristics. Data labeled with characteristic information can then be used to train this new network. Once the training for characteristics (for example, predicting the Big Five personalities) is finished, one or more layers of encoder can be added on top of the output layer for characteristics. Usually, this new layer has a node size no more than the output layer for characteristics in order to further cluster the characteristics into a smaller number of groups. Alternatively, this new layer can be a Softmax layer so that it outputs discrete values. An unsupervised auto-encoder can be applied to this newly added layer again with the goal of reconstructing the characteristics with minimal errors. More encoders can be added till the level of abstraction is satisfied.

Each level of encoders on top of the output layer of characteristics gives an abstraction of characteristics. As shown in FIG. 2, top-level encoders provide more abstracted features. A person's characteristic profile can thus be directly estimated in different abstract levels. A merchant company can specify which level of abstraction interests them more.

Characteristics-Based Message-Delivery System

Figure 3:
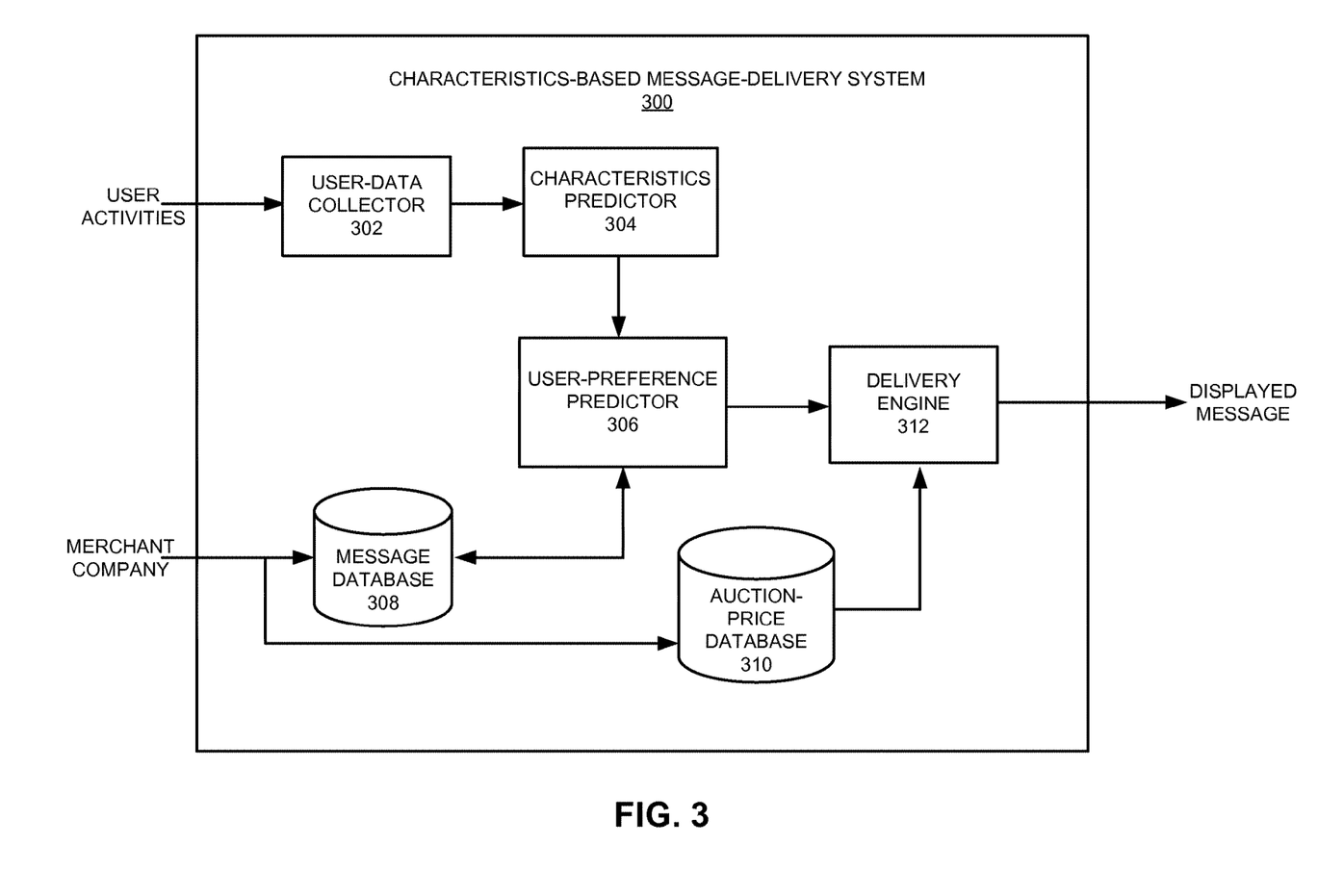
FIG. 3 presents a diagram illustrating an exemplary characteristics-based message-delivery system, in accordance with an embodiment of the present invention.

FIG. 3 presents a diagram illustrating an exemplary characteristics-based message-delivery system, in accordance with an embodiment of the present invention. In FIG. 3, characteristics-based message-delivery system 300 includes a user-data collector 302, a characteristics predictor 304, a user-preference predictor 306, a message database 308, an auction-price database 310, and a delivery engine 312.

User-data collector 302 is responsible for collecting text, social, and behavioral data from their respective sources. For example, user-data collector 302 can collect social data associated with a user based on the user's interactions with other users in social networking sites.

Characteristics predictor 304 is responsible for analyzing collected user data and predicting the user's characteristics based on the collected data. In some embodiments, various machine-learning techniques, such as decision tree learning, support vector machines (SVM) and Bayes networks, can be used by characteristics predictor 304 to predict the user's characteristics. More specifically, characteristics predictor 304 can be trained offline. For example, the system can send a survey of personality traits to a number of users, or have the users complete a web-based (or other types of) survey to provide their demographic and personality information. The users rate themselves on a scale with respect to the personality traits. The system may also compute relative, scaled measurements of the surveyed population's personality traits. While training characteristics predictor 304, the system collects users' activity data, and trains characteristics predictor 304 using personality trait measurements from the survey results and the collected user activity data. After characteristics predictor 304 is trained, it can analyze the collected activity data of other users, and estimate the characteristics of the other users. In some embodiments, characteristics predictor 304 outputs the user characteristics as Big Five personality traits. In further embodiments, the Big Five personality traits are expressed as real-value vectors. Moreover, characteristics predictor 304 may map the estimated characteristic profile of a user into a pre-labeled group. The pre-labeled group may be a node in a pre-defined user-characteristics hierarchical tree. Note that if a particular user's characteristic profile is mapped to a certain node, it also belongs to the node's parent node.

User-preference predictor 306 is responsible for predicting a user's preference for a message based on the content of the message and the estimated characteristics of the user. The message is provided by the merchant company and can be stored in message database 308. Message content can include audio, visual, and text information. In some embodiments, the content of a message can also be expressed as a real-value vector. For example, for a text message, the real-value vector may be a vector reflecting the occurrence frequency of certain terms (such as the term "cars"). For visual information, the real-value vector may be a vector reflecting the occurrence frequency of certain video clips or visual images.

User-preference predictor 306 can also be trained offline. In some embodiments, the system trains user-preference predictor 306 using real usage data. For example, the system can collect real users' reactions to (or level of preference for) certain messages, obtain these users' characteristic profiles (for example, based on outputs of characteristics predictor 304), and then train user-preference predictor 306 using these real data. In some embodiments, the system can train user-preference predictor 306 using crowdsourcing, such as Amazon Mechanical Turk, by recruiting people to submit their evaluations on various messages and to take personality surveys. The system can then train user-preference predictor 306 based on the evaluations provided by people with different personalities. More specifically, the system can use features extracted from the messages and users' characteristic profiles to train user-preference predictor 306. Various methods can be used to train user-preference predictor 306 based on the collected user characteristics and user preference scores for certain messages. In some embodiments, the features extracted from the messages and the users' characteristics are both real-value vectors, and a regression model can be built based on these real-value vectors and the known preference scores. Once user-preference predictor 306 is trained, it can be used to predict a user's preference for a message based on the user's characteristics and content of the message. Note that here the user's preference for a message includes the likelihood that the user would click a link to view the message, as well as the likelihood that the user would adopt the advertised product after viewing or listening to the message. To reduce the computation time, such use preference can be pre-computed and stored for each message and typical characteristic profiles. For example, the system may compute the preference of "couch potatoes" for a particular message, and save the computed result. In one embodiment, such results are saved at message database 308. For example, each message entry in message database 308 may include the pre-computed preference levels for the message by users with different types of characteristic profiles. User-preference predictor 306 can then use such message-preference pairing to predict the user's preference for a certain message based on inferred user characteristics.

Auction-price database 310 stores a price matrix indicating the price that the merchant company is willing to pay to deliver its messages to people with certain characteristics. For example, a sports car company may wish to pay more to deliver its ads to people with a high extraversion score and pay less to deliver its ads to people with a low extraversion score. In some embodiments, the price matrix may include a table, with each row in the table for a message and each column for a type of characteristic profile. Note that, as we have mentioned in the previous section, characteristics expressed as real-value vectors can be too complex, and the number of variations in personalities can be huge. Therefore, it is more convenient to have a limited number of personality groups, and the merchant company can indicate the amount of money it is willing to pay to deliver a message to people with characteristics falling within each group. In some embodiments, the merchant company may be provided with a hierarchical tree (as shown in FIG. 1), which illustrates the hierarchical relationship among groups. The merchant company can then set bidding prices for each group in the hierarchical tree. In general, along a same tree branch, the farther away from the root a group is located on a tree, the more the merchant may wish to pay. There may be multiple price levels for a message. For example, the merchant company can set a certain price to pay to display an ad to users with certain characteristics. Or the merchant company can further specify a price it is willing to pay when the user actually clicks-through the ad. Additionally, if the message is linked to a purchase site, the merchant company can specify an even higher price it is willing to pay when the user actually makes a purchase.

Note that the merchant company can also improve its messages based on user-preference information obtained from user-preference predictor 306. When drafting messages each merchant company may have some targeted users (such as extraverts or couch potatoes) in mind. User-preference predictor 306 can estimate the actual preference level of the intended audience of the merchant company's messages. For example, a merchant company may target couch potatoes with its ads, and user-preference predictor 306 can be used to estimate whether its messages will be popular among couch potatoes. Based on this feedback, the merchant company can revise or draft another message that appeals better to the targeted audience. Moreover, the user-preference information may also provide guidance to the merchant company when it sets the bidding price for the message. For example, if the merchant company learns that a message may appeal to a particular characteristic group, the company may wish to bid higher to have this message delivered to users within the characteristic group.

Delivery engine 312 is responsible for delivering a message to a user based on the predicted user preference and the price the merchant company is willing to pay. More specifically, delivery engine 312 selects a message that can maximize the benefit to deliver. For example, once the system identifies a user with certain characteristics, the system can check to see which company is willing to pay a highest price for delivering a message to such a user, and then displays such a message accordingly. Alternatively, in cases where a payment can only be received when the message is clicked, the system can estimate the user's preference for a message (which can be defined as the likelihood that the user will click on the message) based on the inferred user characteristics and the content of the message, determines the auction price for these message (or a potential payment if the message is clicked), and selects a message based on both the user preference and the auction price. In one embodiment, delivery engine 312 delivers a message that can maximize expected benefit (which can be expressed as the product of the likelihood that the message is clicked and the payment received for such an occurrence). In other words, if the likelihood of a message being clicked by users with certain characteristics A is P(A), and the amount the merchant company is willing to pay if a user clicks the message is B, then the expected benefit can be defined as P(A)×B. Delivery engine 312 selects a message that can maximize the expected benefit, and delivers the message to the user. Each time the message is displayed and/or gets clicked by the user, the merchant company will submit a payment accordingly. Note that such an arrangement places the burden on the message-delivery system such that it has to accurately predict the user's preference for the message in order to make a profit. Hence, it can attract the merchant company to do business with the message-delivery system.

Figure 4:
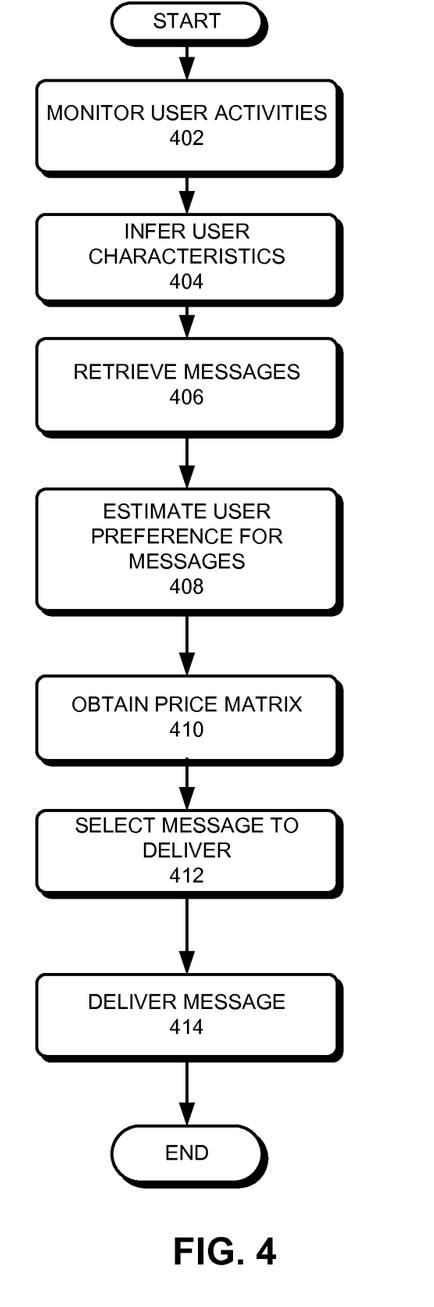
FIG. 4 presents a flowchart illustrating an exemplary process of characteristics-based message delivery, in accordance with an embodiment of the present invention.

FIG. 4 presents a flowchart illustrating an exemplary process of characteristics-based message delivery, in accordance with an embodiment of the present invention. During operation, the system monitors the user's activities (operation 402). In one embodiment, the system monitors the user's activities from various perspectives. More particularly, the system may collect various types of data, which can include but are not limited to: behavior data, social networking data, and textual data. Based on these collected data, the system infers the user's characteristics (operation 404). In some embodiments, a characteristic predictor is trained beforehand in order to infer a user's characteristics based on the collected user activity data. The user's characteristics can be expressed as Big Five personality traits. In a further embodiment, the user's characteristic profile can be mapped into one of a number of pre-defined characteristic groups. These pre-defined characteristic groups can be obtained manually or automatically via a machine-learning method. In some embodiments, a deep learning technique can be used to obtain different abstraction levels of a user's characteristics.

Subsequently, the system retrieves a number of messages (operation 406), and estimates the user's preference for the messages based on the inferred user characteristics and the content of the message (operation 408). Note that the messages can be obtained from multiple merchant companies who compete for a message-delivery opportunity, which can be a banner or a sidebar on a web page browsed by the user, or a video/audio clip. In some embodiments, preferences for a message by users with certain characteristic profiles are calculated beforehand and saved as a table along with the message in the message database. In such a situation, estimating the user's preference involves table lookup. The system further obtains a price matrix (operation 410). In general, entries to the price matrix are provided by the various merchant companies (or the companies trying to deliver the messages to users via the message-delivery system), and indicate the amount companies are willing to pay for delivering a particular message to users with various characteristics. For example, the price matrix can be a table with each row for a particular message, and each column for a particular user group. As we have discussed previously, the user groups are pre-defined, and a user can be mapped to one or more user groups based on the user's characteristic profile. In some embodiments, the user groups are organized as a hierarchical tree, and the price matrix can be organized accordingly.

The system then selects a message based on the expected benefit for delivering such a message (operation 412), and delivers the message (operation 414). The expected benefit can be the money paid by the merchant company for delivering the message. Alternatively, if the merchant company specifies a payment amount for each "click-through" or "conversion" occurrence, estimating the expected benefit can further include calculating a product of the likelihood that the user clicks-through or adopts the product and the payment amount for such an occurrence. Note that the likelihood of the user clicking-through the message or adopting the product may be included in the estimated user preference for the message.

Computer System

Figure 5:
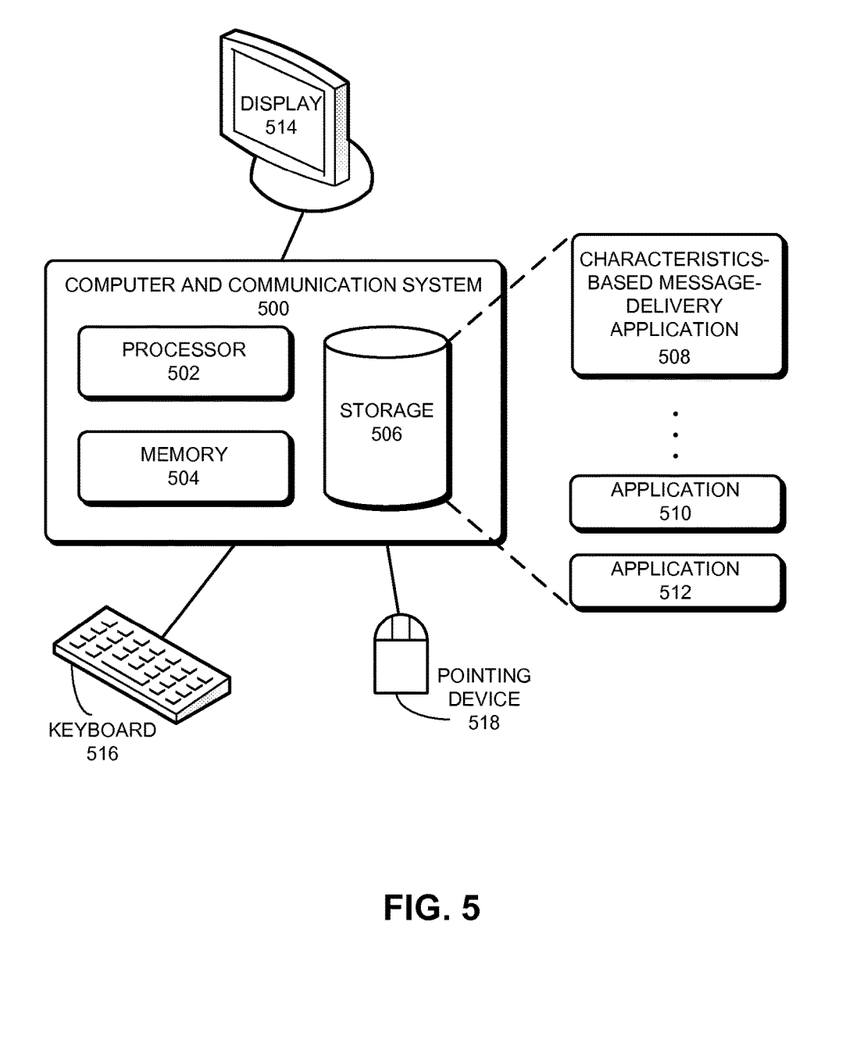
FIG. 5 illustrates an exemplary computer system for characteristics-based message delivery, in accordance with an embodiment of the present invention.

FIG. 5 illustrates an exemplary computer system for characteristics-based message delivery, in accordance with one embodiment of the present invention. In one embodiment, a computer and communication system 500 includes a processor 502, a memory 504, and a storage device 506. Storage device 506 stores a characteristics-based message-delivery application 508, as well as other applications, such as applications 510 and 512. During operation, characteristics-based message-delivery application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for characteristics-based message delivery, the method comprising:
applying, by a computing device, a first machine-learning technique to cluster a set of characteristic profiles into a plurality of personality profile groups;
representing the plurality of personality profile groups as a hierarchical tree such that a respective node of the hierarchical tree corresponds to a personality profile group;
receiving, by the computing device, activity data associated with a user;
adding, by applying a second machine-learning technique to the activity data, the user to a first personality profile group occupying a first node of the hierarchical tree, wherein a parent node of the first node represents users having personality profile scores in a parent range, and wherein the first personality profile group has scores within a subset of the parent range;
receiving, by the computing device, a plurality of messages and a plurality of bids including a bidding price matrix from a merchant company:
wherein the bidding price matrix includes matrix entries with bidding prices for delivering a message to users within the first and parent nodes of the tree, respectively; and
wherein the bidding price in the matrix corresponding to the first node exceeds the price for the parent node of the first node;
predicting preferences of a plurality of nodes in the hierarchical tree, including the first node and the parent node, for the plurality of messages;
selecting a message based on a lookup of the predicted preferences of the first node, and based on the bidding price matrix; and
presenting, on a display, the selected message to the user.

2. The method of claim 1, wherein adding the user to the first personality profile group involves applying the second machine-learning technique to the activity data in order to derive Big Five personality traits associated with the user and with the first personality profile group.

3. The method of claim 2, wherein the first machine-learning technique is a k-means clustering or agglomerative clustering heuristic.

4. The method of claim 3, wherein representing the plurality of personality profile groups as the hierarchical tree comprises generating the hierarchical tree by applying the k-means clustering or agglomerative clustering heuristic to cluster a set of user characteristic profile groups into a smaller set of groups; and wherein the first personality profile group belongs to the smaller set of groups.

5. The method of claim 1, wherein the bidding price matrix includes a plurality of matrix entries, wherein a respective matrix entry includes a bidding price for delivering a message to users having a characteristic profile within a respective node of the hierarchical tree.

6. The method of claim 5, wherein a bidding price in the matrix corresponding to a respective child node of the hierarchical tree exceeds a bidding price corresponding to a parent node of the child node.

7. The method of claim 5, wherein the bidding price in a matrix entry is generated based on a predicted preference of the node for the message associated with the entry.

8. The method of claim 1, wherein the plurality of nodes in the hierarchical tree includes parent nodes and child nodes, and wherein characteristic profiles within a respective child node belong to a respective parent node of the child node.

9. The method of claim 1, wherein selecting the message is further based on a product of a respective bid for the message and an estimate of a likelihood that the user clicks the message.

10. The method of claim 1, wherein representing the plurality of personality profile groups as the hierarchical tree comprises generating the hierarchical tree by applying an auto-encoding deep-learning heuristic to stack a set of encoders and corresponding decoders in a deep neural network.

11. The method of claim 10, further comprising performing unsupervised pre-training based on one or more of:
a username or other name associated with the user;
a writing style of the user;
social network information of the user; and
online behavior of the user.

12. A non-transitory computer-readable storage medium storing instructions that when executed by a computer cause the computer to perform a method for characteristics-based message delivery, the method comprising:
applying a first machine-learning technique to cluster a set of characteristic profiles into a plurality of personality profile groups;
representing the plurality of personality profile groups as a hierarchical tree such that a respective node of the hierarchical tree corresponds to a personality profile group;
receiving activity data associated with a user;
adding, by applying a second machine-learning technique to the activity data, the user to a first personality profile group occupying a first node of the hierarchical tree, wherein a parent node of the first node represents users having personality profile scores in a parent range, and wherein the first personality profile group has scores within a subset of the parent range;
receiving a plurality of messages and a plurality of bids including a bidding price matrix from a merchant company:
wherein the bidding price matrix includes matrix entries with bidding prices for delivering a message to users within the first and parent nodes of the tree, respectively; and
wherein the bidding price in the matrix corresponding to the first node exceeds the price for the parent node of the first node;
predicting preferences of a plurality of nodes in the hierarchical tree, including the first node and the parent node, for the plurality of messages;
selecting a message based on a lookup of the predicted preferences of the first node, and based on the bidding price matrix; and
presenting, on a display, the selected message to the user.

13. The computer-readable storage medium of claim 12, wherein adding the user to the first personality profile group involves applying the second machine-learning technique to the activity data in order to derive Big Five personality traits associated with the user and with the first personality profile group.

14. The computer-readable storage medium of claim 12, wherein the bidding price matrix includes a plurality of matrix entries, wherein a respective matrix entry includes a bidding price for delivering a message to users having a characteristic profile within a respective node of the hierarchical tree.

15. The computer-readable storage medium of claim 12, wherein the plurality of nodes in the hierarchical tree includes parent nodes and child nodes, and wherein characteristic profiles within a respective child node belong to a respective parent node of the child node.

16. The computer-readable storage medium of claim 12, wherein selecting the message is further based on a product of a respective bid for the message and an estimate of a likelihood that the user clicks the message.

17. A computer system for characteristics-based message delivery, comprising:
 a processor implementing a profile-management mechanism, a receiving mechanism, a characteristic predictor, a preference predictor, a selection mechanism, and a message delivery mechanism;
 wherein the profile-management mechanism is configured to:
 apply a first machine-learning technique to cluster a set of characteristic profiles into a plurality of personality profile groups;
 represent the plurality of personality profile groups as a hierarchical tree such that a respective node of the hierarchical tree corresponds to a personality profile group;
 wherein the receiving mechanism is configured to receive activity data associated with a user;
 wherein the characteristic predictor is configured to add, by applying a second machine-learning technique to the activity data, the user to a first personality profile group occupying a first node of the hierarchical tree, wherein a parent node of the first node represents users having personality profile scores in a parent range, and wherein the first personality profile group has scores within a subset of the parent range;
 a message database comprising a plurality of messages;
 an auction price database comprising a plurality of bids including a bidding price matrix from a merchant company:
 wherein the bidding price matrix includes matrix entries with bidding prices for delivering a message to users within the first and parent nodes of the tree, respectively; and
 wherein the bidding price in the matrix corresponding to the first node exceeds the price for the parent node of the first node;
 wherein the preference predictor is configured to predict preferences of a plurality of nodes in the hierarchical tree, including the first node and the parent node, for the plurality of messages;
 wherein the selection mechanism is configured to select a message based on a lookup of the predicted preferences of the first node, and based on the bidding price matrix; and
 wherein the message delivery mechanism is configured to present, on a display, the selected message to the user.

18. The computer system of claim 17, wherein while adding the user to the first personality profile group, the characteristic predictor is configured to apply the second machine-learning technique to the activity data in order to derive Big Five personality traits associated with the user and with the first personality profile group.

19. The computer system of claim 17, wherein the bidding price matrix includes a plurality of matrix entries, wherein a respective matrix entry includes a bidding price for delivering a message to users having a characteristic profile within a respective node of the hierarchical tree.

20. The computer system of claim 17, wherein the selection mechanism further selects the message further based on a product of a respective bid for the message and the estimate of the likelihood that the user clicks the message.

* * * * *